United States Patent
Zhong

(10) Patent No.: US 7,721,861 B2
(45) Date of Patent: *May 25, 2010

(54) CLUTCH MECHANISM FOR USE IN POWER TOOLS

(75) Inventor: Chen Cheng Zhong, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 664 days.

This patent is subject to a terminal disclaimer.

(21) Appl. No.: 11/444,964

(22) Filed: Jun. 1, 2006

(65) Prior Publication Data

US 2006/0289264 A1      Dec. 28, 2006

Related U.S. Application Data

(63) Continuation-in-part of application No. 11/346,624, filed on Feb. 2, 2006, now Pat. No. 7,530,881.

(30) Foreign Application Priority Data

| Feb. 4, 2005 | (CN) | ............... 2005 1 0038340 |
| Jun. 3, 2005 | (CN) | ............... 2005 1 0075712 |

(51) Int. Cl.
   *B24B 23/03* (2006.01)
   *F16D 41/066* (2006.01)

(52) U.S. Cl. .................. 192/48.92; 74/571.1

(58) Field of Classification Search .......... None
   See application file for complete search history.

(56) References Cited

U.S. PATENT DOCUMENTS

| 2,270,816 A | 1/1942 | Zonis |
| 3,364,625 A | 1/1968 | Sogge |
| 3,499,347 A | 3/1970 | Pearson |
| 4,610,111 A | 9/1986 | Cox |
| 4,712,450 A * | 12/1987 | Takamiya et al. ........... 475/170 |
| 4,744,177 A | 5/1988 | Braun et al. |
| 4,989,704 A * | 2/1991 | Morishita et al. ............. 192/45 |
| 5,129,871 A * | 7/1992 | Sandel et al. ............... 475/297 |
| 5,947,804 A | 9/1999 | Fukinuki et al. |
| 2006/0189267 A1* | 8/2006 | Zhong ........................ 451/357 |

FOREIGN PATENT DOCUMENTS

DE          4202724 A1     8/1993

(Continued)

*Primary Examiner*—Richard M. Lorence
(74) *Attorney, Agent, or Firm*—Pate Pierce & Baird

(57) ABSTRACT

The present invention discloses a clutch mechanism to adjust eccentricity in a power tool. The clutch mechanism comprises an outer race mounted radially on an annular main body which is mounted on an eccentric shaft. At least one first connecting member is disposed between the outer race and the annular main body. At least one second connecting member is disposed between the annular main body and the eccentric shaft. The first connecting member makes the outer race and the annular main body rotate relative to each other at one way. The second connecting member makes the annular main body and the eccentric shaft rotate relative to each other at one way. The annular main body has an axial projection formed thereon to connect with an eccentric mechanism in the power tool. With this type of clutch mechanism, the adjusted eccentricity will not change during working and torque can be transferred stably.

14 Claims, 10 Drawing Sheets

FOREIGN PATENT DOCUMENTS

| | | |
|---|---|---|
| EP | 0820838 B2 | 7/1997 |
| EP | 0 820 838 A1 | 1/1998 |
| FR | 580647 | 11/1924 |
| GB | 932100 | 7/1963 |
| GB | 1038586 A | 8/1966 |
| JP | 63 156652 A | 6/1988 |
| JP | 04131527 A * | 5/1992 |
| JP | 2001-179591 | 7/2001 |

* cited by examiner

M - M

N - N

CLUTCH MECHANISM FOR USE IN POWER TOOLS

RELATED APPLICATION

This application is a continuation-in-part of U.S. patent application Ser. No. 11/346,624, filed Feb. 2, 2006 now U.S. Pat. No. 7,530,881 and entitled "ECCENTRIC STROKE ADJUSTING MECHANISM," which is incorporated herein by reference.

BACKGROUND

1. Field of the Invention

The present invention relates to a clutch mechanism for use in a power tool.

2. Background Art

EP-A-820838 discloses a clutch mechanism for use in a power tool to adjust eccentricity. The clutch mechanism is used to connect a tool head with an eccentric sleeve. The eccentric sleeve can rotate relative to an eccentric fan wheel. A spring-loaded detent member is installed on the eccentric sleeve. A ring member is secured to the eccentric fan wheel and has at least two detent recesses formed thereon. To adjust eccentricity, the tool head is turned and the eccentric sleeve turns which makes the spring-loaded detent member engage different detent recesses on the ring member. Spring-loaded detent members and detent recess of this type are used generally in the art to transfer torque. However when the torque exceeds a certain level, the detent member slides out of the detent recess which causes the transfer to fail and the eccentricity to change thereby decreasing work efficiency.

SUMMARY AND OBJECTS OF THE INVENTION

In view of the foregoing, it is a primary object of the present invention to provide a new and improved clutch mechanism for use in a power tool to adjust eccentricity.

Another object of the present invention is to provide a clutch mechanism for use in a power tool to adjust eccentricity which makes the adjusted eccentricity stable and can transfer power stably irrespective of whether the torque increases or not.

In an embodiment, the present invention provides a clutch mechanism for use in a power tool to adjust eccentricity. The clutch mechanism may comprise an outer race, an annular main body, an eccentric shaft, at least one first connecting member disposed between the outer race and the annular main body and at least one second connecting member disposed between the annular main body and the eccentric shaft. The first connecting member makes the outer race and the annular main body rotatable relative to each other one way. The second connecting member makes the annular main body and the eccentric shaft rotatable relative to each other one way.

In a preferred embodiment, the present invention provides a clutch mechanism for adjusting eccentricity in a power tool comprising:

an eccentric shaft driveable by a principle drive shaft;
an annular main body mounted radially on the eccentric shaft;
an outer race mounted radially-on the annular main body;
at least one first connecting member disposed between the outer race and the annular main body such that when the principle drive shaft is locked the outer race and the annular main body are rotatable together in a common direction; and at least one second connecting member disposed between the annular main body and the eccentric shaft such that when the principle drive shaft rotates the annular main body and the eccentric shaft are rotatable together in a common direction.

The clutch mechanism of the present invention makes adjusted eccentricity stable and can transfer power stably irrespective of whether torque increases or not. In particular, the clutch mechanism of the present invention permits eccentricity to be adjusted whilst remaining unchanged during use. Torque can be transferred stably and working efficiency is improved.

In a preferred embodiment, a first inclined wall is formed between the outer race and the annular main body and a second inclined wall is formed between the annular main body and the eccentric shaft, wherein the first connecting member is a first roller movable along the first inclined wall and the second connecting member is a second roller movable along the second inclined wall.

Preferably the annular main body has an outer circumferential wall and an inner circumferential wall and wherein the first inclined wall is formed on the outer circumferential wall and the second inclined wall is formed on the inner circumferential wall. Particularly preferably the inner circumferential wall has a plurality of first wedge-shaped recesses and the outer circumferential wall has a plurality of second wedge-shaped recesses, each first wedge-shaped recess having a wall which serves as the first inclined wall and each second wedge-shaped recess having a wall which serves as the second inclined wall. Particularly preferably each first and second wedge-shaped recess terminates in a narrow receiving bore. Preferably in each narrow receiving bore is disposed a loaded elastic member.

In a preferred embodiment, the annular main body has an axial projection formed on an end face which is cooperable with a corresponding recess on an eccentric mechanism. In a preferred embodiment, the annular main body includes a base having at least one first securement member and a cover having at least one second securement member adapted to mate with the first securement member.

In a preferred embodiment, the eccentric shaft has a longitudinal bore for securely mounting the eccentric shaft radially on the principle drive shaft.

Preferably the annular main body has an inner circumferential wall and an outer circumferential wall, wherein the eccentric shaft has an outer wall and a longitudinal bore with a central axis A, wherein the central axis of the outer wall and the inner circumferential wall is Q and the central axis of the outer circumferential wall and the outer race is P, wherein the central axes A, P and Q are eccentric.

Preferably the annular main body has an inner circumferential wall having a plurality of first wedge-shaped recesses and an outer circumferential wall having a plurality of second wedge-shaped recesses, wherein in each first wedge-shaped recess is seated the second connecting member and in each second wedge-shaped recess is seated the first connecting member, wherein each of the first connecting member and second connecting member is an elastic element connected to a roller whereby the elastic element urges the roller outwardly.

Preferably when in use the principle drive shaft rotates, the rollers in the inner circumferential wall securely engage the principle drive shaft.

Preferably when in use the principle drive shaft rotates, the rollers in the outer circumferential wall disengage the outer race.

Preferably when in use the principle drive shaft is locked, the rollers in the outer circumferential wall engage the outer race.

Preferably when in use the principle drive shaft is locked, the central axis P rotates around the central axis Q whereby to adjust the eccentric stroke P relative to A.

A first sanding plate may be operably connected or coupled to the eccentric shaft. A coupling member (eg a coupling sleeve) may be radially mounted on the eccentric shaft and may carry a first sanding plate (eg an outer sanding plate). The central axis of the coupling member (and therefore the first sanding plate) is the central axis P. When the principle drive shaft of the power tool is locked (for example by a chuck), the outer race may be rotated causing the annular main body to rotate with the outer race such that the central axis P rotates around the central axis Q whereby to adjust the eccentric stroke (ie P relative to A) of the first sanding plate.

An eccentric mechanism of the power tool may be mounted on the principle drive shaft. An axial projection may be formed on one face of the cover for connecting the annular main body to the eccentric mechanism of the power tool. The eccentric mechanism may comprise a second eccentric shaft securely mounted radially on the principle drive shaft. A coupling member (eg a coupling sleeve) may be radially mounted on the second eccentric shaft and may carry a second sanding plate (eg an inner sanding plate). The central axis T of the coupling member (and therefore the second sanding plate) and central axis P may be symmetrically distributed around the central axis A. When the principle drive shaft of the power tool is locked (for example by a chuck), the outer race may be rotated causing the annular main body to rotate with the outer race such that the central axis T rotates around the central axis Q whereby to adjust the eccentric stroke (ie T relative to A) of the second sanding plate.

In an embodiment, a first eccentric member is mounted radially on the principle drive shaft, the first eccentric member having a first central axis; a second eccentric member is mounted radially on the principle drive shaft, the second eccentric member having a second central axis; and the mechanism further comprises a coupling member for coupling the first eccentric member to the second eccentric member, wherein the eccentricity of the first central axis and the eccentricity of the second central axis with respect to the central axis of the principle drive shaft are adjustable.

In a preferred embodiment, the first eccentric member has a first eccentric sleeve, the second eccentric member has a second eccentric sleeve and the first eccentric sleeve and the second eccentric sleeve are rotatable relative to the principle drive shaft, wherein a central axis of the first eccentric sleeve is the first central axis of the first eccentric member and a central axis of the second eccentric sleeve is the second central axis of the second eccentric member.

Particularly preferably the first eccentric member has a first eccentric shaft, the second eccentric member has a second eccentric shaft and the first eccentric shaft and second eccentric shaft are securely mounted radially on the principle drive shaft, wherein the first eccentric sleeve and the second eccentric sleeve are rotatably mounted on the first eccentric shaft and the second eccentric shaft respectively, wherein a central axis of the first eccentric shaft and a central axis of the second eccentric shaft are eccentric with respect to the central axis of the principle drive shaft, wherein the central axis of the first eccentric sleeve is eccentric with respect to the central axis of the first eccentric shaft and to the central axis of the principle drive shaft and wherein the central axis of the second eccentric sleeve is eccentric with respect to the central axis of the second eccentric shaft and to the central axis of the principle drive shaft.

A second sanding plate may be operably connected or coupled to the second eccentric sleeve so that in practice the central axis of the second eccentric sleeve is the central axis of the second eccentric member and of the second sanding plate.

Preferably the central axis of the first eccentric sleeve and the central axis of the second eccentric sleeve are on opposite sides of the central axis of the principle drive shaft. The central axis of the first eccentric sleeve and the central axis of the second eccentric sleeve may be parallel to the central axis of the principle drive shaft. The central axis of the first eccentric sleeve, the central axis of the second eccentric sleeve and the central axis of the principle drive shaft may be in a common plane. The central axis of the first eccentric sleeve and the central axis of the second eccentric sleeve may be equidistant from the central axis of the principle drive shaft. The central axis of the first eccentric sleeve and the central axis of the second eccentric sleeve may be angularly displaced relative to the central axis of the principle drive shaft by 180°.

Preferably the central axis of the first eccentric shaft and the central axis of the second eccentric shaft are on opposite sides of the central axis of the principle drive shaft. The central axis of the first eccentric shaft and the central axis of the second eccentric shaft may be parallel to the central axis of the principle drive shaft. The central axis of the first eccentric shaft, the central axis of the second eccentric shaft and the central axis of the principle drive shaft may be in a common plane. The central axis of the first eccentric shaft and the central axis of the second eccentric shaft may be equidistant from the central axis of the principle drive shaft. The central axis of the first eccentric shaft and the central axis of the second eccentric shaft may be angularly displaced relative to the central axis of the principle drive shaft by 180°.

The first eccentric sleeve and second eccentric sleeve may be substantially cylindrical and may terminate in a radial collar.

A bearing may be tightly mounted radially on the second eccentric sleeve. A bearing seat may be mounted around the perimeter of the bearing. A sanding plate may be fastened to the bearing seat.

Preferably the coupling member is securely mounted on the first eccentric shaft and has a first pin on an upper surface and a second pin on a lower surface, wherein each of the first eccentric sleeve and the second eccentric sleeve has a radial slot to receive the first pin and second pin respectively, wherein the width of the slot approximates to the diameter of the pin. To mount the coupling member on the first eccentric shaft, the first eccentric shaft may comprise an annular protrusion on its lower face.

Preferably the coupling member has an operating body rotatably mounted on the principle drive shaft and an extension pin extending axially from the operating body, wherein each of the first eccentric sleeve and the second eccentric sleeve has a receiving bore for receiving the extension pin, wherein the diameter of the receiving bore approximates to the diameter of the extension pin and the receiving bore is longer than the extension pin.

Preferably a plurality of locating sockets are formed on the outer surface of the first eccentric shaft and of the second eccentric shaft and a plurality of receiving recesses are formed on the inner circumferential surface of the first eccentric sleeve and of the second eccentric sleeve, wherein in each receiving recess is seated an elastic element (e.g., a spring) connected to a locating post, wherein each locating post is selectively received in a locating socket so as to restrainedly couple the first and the second eccentric sleeve with the first and the second eccentric shaft respectively.

A first sanding plate may be connected or coupled to the first eccentric member. A second sanding plate may be connected or coupled to the second eccentric member. The first sanding plate and second sanding plate may terminate at the base of housing. The first sanding plate and second sanding plate may be an outer sanding and an inner sanding plate. The or each sanding plate may be annular (e.g., stepped annular).

Preferably the clutch mechanism further comprises a principle drive shaft locking device. Particularly preferably the principle drive shaft locking device comprises:

a chuck mounted radially on the principle drive shaft, wherein the chuck has a skirt extending axially downwardly from its circumferential edge, wherein a plurality of recesses are located around the skirt; and a locking member attached to the housing, wherein the locking member is selectively insertable into a recess to lock the chuck and prevent the principle drive shaft from rotating. More preferably the clutch mechanism further comprises: a balancing drum, wherein the chuck has a central aperture surrounded by an eccentric hub and the balancing drum is securely mounted on the eccentric hub.

A plurality of spaced apart location holes may be formed around the eccentric hub. The balancing drum may comprise a central aperture bound by a hub.

The annular main body may abut an end face of the balancing drum (e.g., the hub). The balancing drum may have a part radial recess extending from the hub. A spring and a ball head locating post connected to the spring may be disposed in the recess. The ball head locating post may be urged partly into a location hole on the eccentric hub to restrainedly couple the balancing drum and the chuck.

The annular main body may abut an end face of the chuck (eg the eccentric hub). The annular main body may have a radial recess. A spring and a ball head locating post connected to the spring may be disposed in the recess. The ball head locating post may be urged partly into a location hole on the eccentric hub to restrainedly couple the clutch and the chuck.

A sanding plate may be mounted radially on the outer race. A support bearing may be radially mounted on the first eccentric sleeve. The support bearing may be substantially axially aligned with the outer race. The sanding plate may be radially mounted on the outer race and the bearing.

A balancing block may be connected or coupled to the second eccentric member.

BRIEF DESCRIPTION OF THE DRAWINGS

The foregoing and other objects and features of the present invention will become more fully apparent from the following description, taken in conjunction with the accompanying drawings. Understanding that these drawings depict only typical embodiments of the invention and are, therefore, not to be considered limiting of its scope, the invention will be described with additional specificity and detail through use of the accompanying drawings in which.

DESCRIPTIONS OF THE PREFERRED EMBODIMENTS

It will be readily understood that the components of the present invention, as generally described herein, could be arranged and designed in a wide variety of different configurations. Thus, the following more detailed description of the embodiments of the present invention as disclosed in the Figures included herein is not intended to limit the scope of the invention, as claimed, but it is merely representative of the presently preferred embodiments of the invention.

Figure 1:
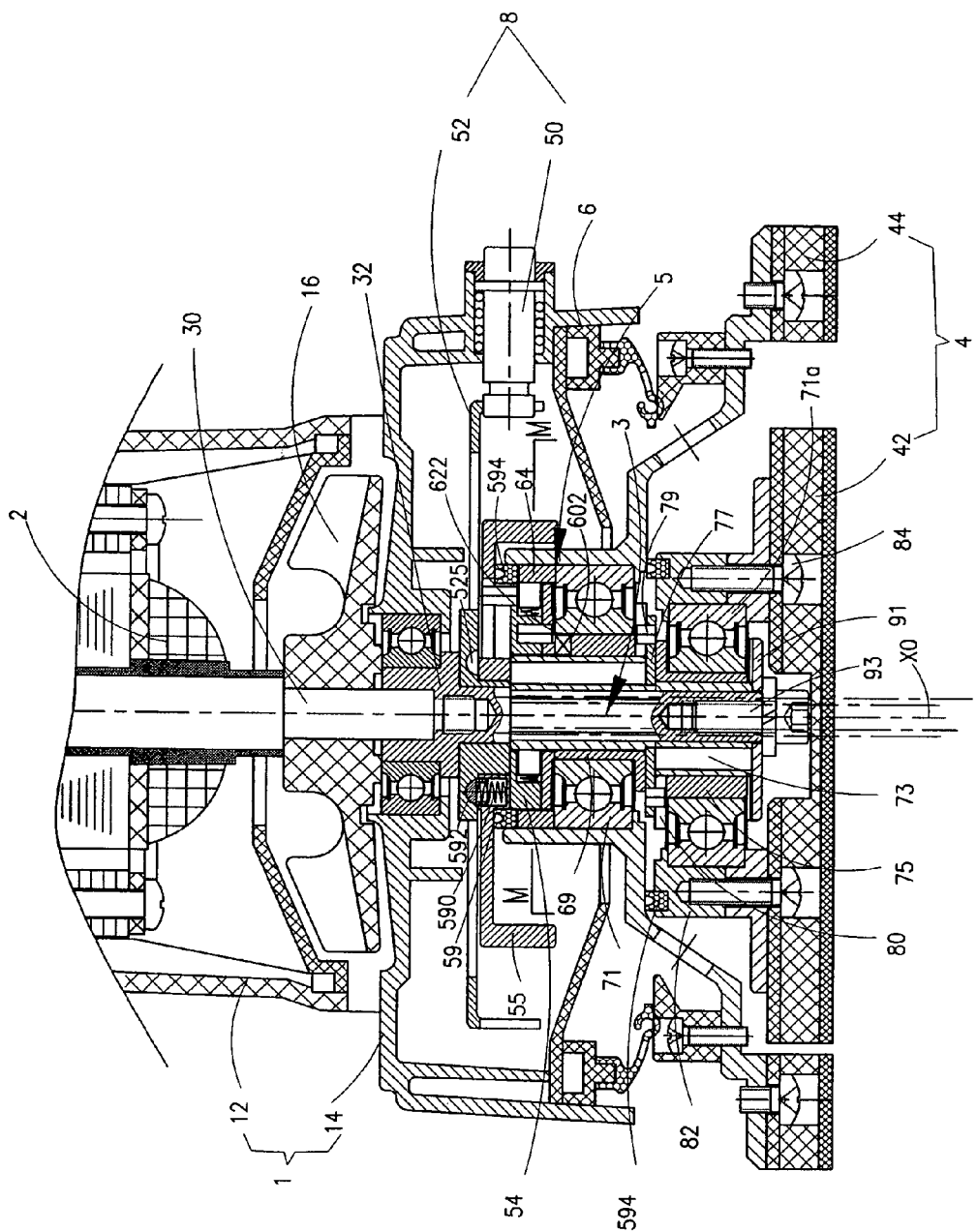
FIG. 1 is a sectional view of a sander according to a first embodiment of the present invention.
Figure 2:
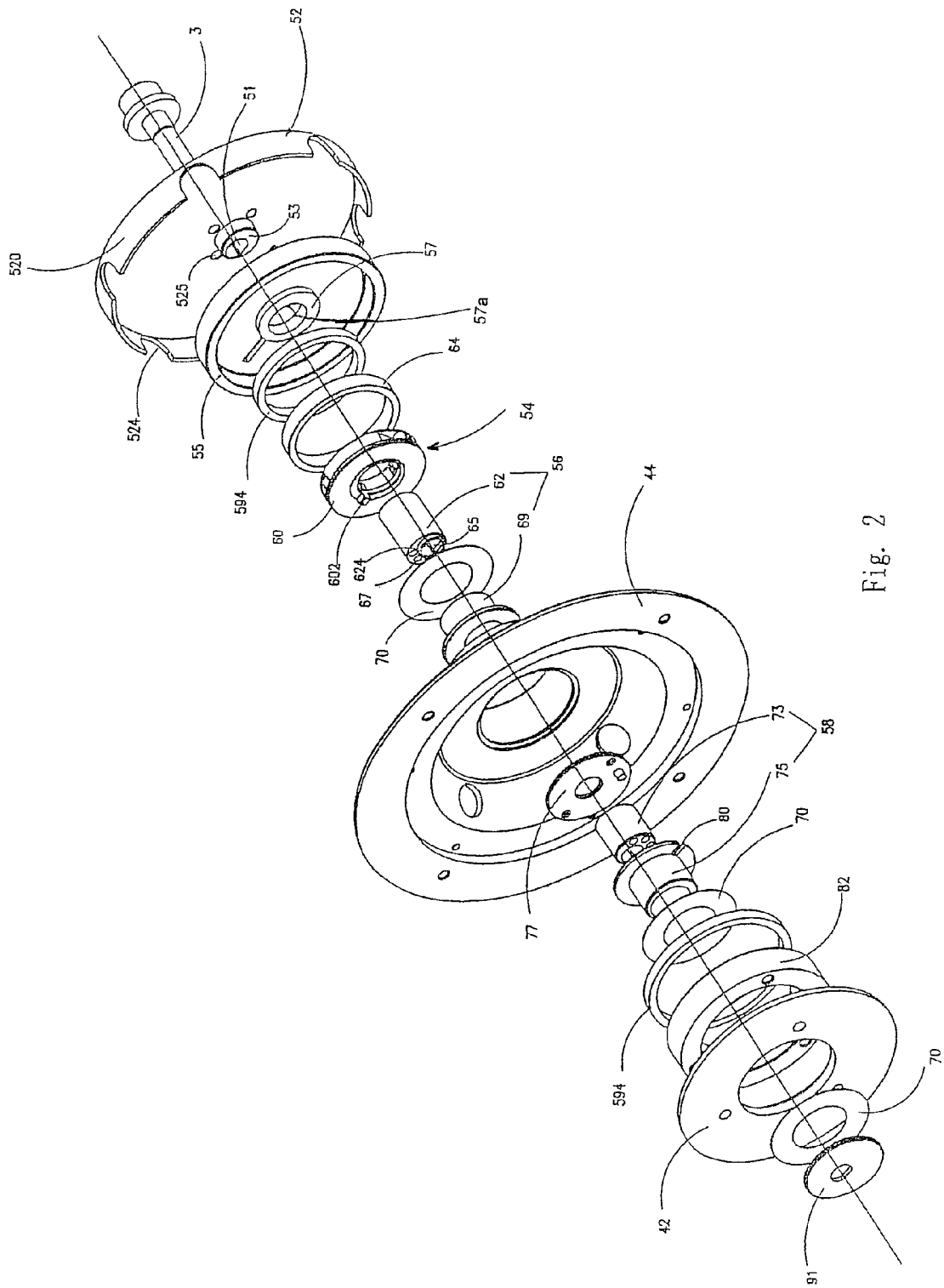
FIG. 2 is a partially exploded view of the sander of FIG. 1.
Figure 3:
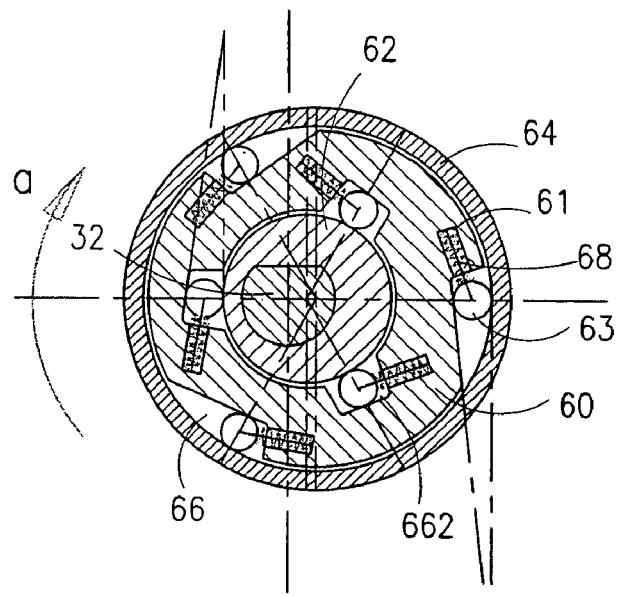
FIG. 3 is a sectional view taken along line M-M shown in FIG. 1.

Referring to FIG. 1, a first embodiment of the present invention is a rotary sander. The sander comprises generally a housing 1, a motor 2 vertically disposed inside the housing 1, a principle drive shaft 3, a sanding plate 4 at the base of the housing and an eccentric stroke adjusting mechanism 5.

Referring to FIGS. 2 to 5, the housing 1 comprises an upper housing part 12 and a lower housing part 14 securely connected to each other. A fan 16 is securely attached to the principle drive shaft 3. The principle drive shaft 3 comprises an armature shaft 30 and a connecting shaft 32 connected to the lower end of the armature shaft 30. The connecting shaft 32 and the armature shaft 30 have a common axis X0. The connecting shaft 32 has an irregular cross-section. The sanding plate 4 has an annular inner plate 42 and an annular outer plate 44. A braking system 6 is disposed between the lower housing part 14 and the annular outer plate 44.

The eccentric stroke adjusting mechanism 5 comprises a principle drive shaft locking device 8, a first eccentric member 56, a second eccentric member 58 and a coupling member 77 for coupling the first eccentric member 56 and the second eccentric member 58. The first eccentric member 56, the coupling member 77 and the second eccentric member 58 are radially mounted on the connecting shaft 32 in sequence downwardly.

The principle drive shaft locking device 8 comprises a chuck 52 mounted radially on an upper part of the connecting shaft 32 and a bolt member 50. The chuck 52 has a skirt 520 extending axially downwardly from its circumferential edge. A plurality of recesses 524 are distributed around the skirt 520. The bolt member 50 is attached to the lower housing part 14 and can be selectively inserted into a corresponding recess 524 to lock the chuck 52 during adjustment of the eccentric stroke of the sanding plate 4 (as described below). The chuck 52 has a substantially central aperture 51 surrounded by an eccentric hub 53. A plurality of spaced apart location holes 525 are formed in the eccentric hub 53.

A balancing drum 55 is mounted on the eccentric hub 53 so as to cooperate with the annular inner plate 42 whereby to balance the weight of the annular outer plate 44. The balancing drum 55 comprises a central aperture 57a bound by a hub 57. The balancing drum 55 has a part radial recess 59 extending from the hub 57. A spring 590 and a ball head locating post 592 connected to the spring 590 are disposed in the recess 59. The ball head locating post 592 extends partially into a location hole 525 under the force of the spring 590 to restrainedly couple the balancing drum 55 and the chuck 52.

The rotary sander of the first embodiment of the present invention further comprises an overrun clutch 54. The overrun clutch 54 is a one way rotation clutch with a self-locking function. The overrun clutch 54 has an annular main body 60 abutting an end face of the hub 57. An outer race 64 is mounted radially on the annular main body 60 between the overrun clutch 54 and the annular outer plate 44. A locking ring 594 is interposed axially between the outer race 64 and the balancing drum 55. The annular main body 60 has an inner circumferential surface with three first wedge-shaped recesses 662 formed thereon and an outer circumferential surface with three second wedge-shaped recesses 66 formed thereon. In the base of each of the first wedge-shaped recess 662 and second wedge-shaped recess 66 is a narrow receiving bore 61. A loaded spring 68 is disposed in each narrow receiving bore 61 and individually connects to a roller 63 seated in the wedge-shaped recess 66, 662. The loaded spring 68 urges the roller 63 away from the narrow receiving bore 61. An axial projection 602 extends from the lower surface of the annular main body 60 adjacent to the inner circumferential surface.

The first eccentric member 56 is radially mounted on the principle drive shaft 3. The first eccentric member 56 comprises a first eccentric shaft 62 having a first bore 65 formed along an axis parallel to its central axis X3. The shape of the first bore 65 matches the shape of the connecting shaft 32 so that the first eccentric shaft 62 can be securely mounted radially on the connecting shaft 32. The central axis X3 is eccentric with respect to the central axis X0. On the upper end of the first eccentric shaft 62 is radially mounted the overrun clutch 54. The first eccentric member 56 further comprises a first eccentric sleeve 69 which is rotatably mounted on a lower end of the first eccentric shaft 62. The first eccentric sleeve 69 has a central axis X1 and the eccentricity of the central axis X1 with respect to the central axis X0 of the principle drive shaft 3 is adjustable. The central axis X1 is eccentric with respect to the central axis X3.

A support bearing 71 is tightly mounted on the first eccentric sleeve 69 and its outer surface is substantially aligned with the outer surface of the outer race 64. The annular outer plate 44 is tightly engaged with the outer surface of the outer race 64 and of the support bearing 71. The central axis of the annular outer plate 44 is coincident with the central axis X1 of the first eccentric sleeve 69 and so the central axis X1 defines in practice the central axis of the first eccentric member 56 as a whole. A washer 70 is disposed axially between the annular main body 60 and the support bearing 71. The end of the first eccentric sleeve 69 abuts the lower face of the washer 70 and has a recess 622 formed on its upper end to receive the projection 602 so that the first eccentric sleeve 69 is securely connected to the overrun clutch 54. The first eccentric shaft 62 has a plurality of bores 67 extending parallel to its central axis X3 to reduce its weight.

The second eccentric member 58 is constructed substantially symmetrically to the first eccentric member 56 with respect to the principle drive shaft 3. The second eccentric member 58 comprises a second eccentric shaft 73 securely mounted radially on the connecting shaft 322 and a second eccentric sleeve 75 rotatably mounted on the second eccentric shaft 73. A central axis X4 of the second eccentric shaft 73 and the central axis X3 of the first eccentric shaft 62 are symmetrically distributed around the central axis X0. A central axis X2 of the second eccentric sleeve 75 and the central axis X1 of the first eccentric sleeve 69 are symmetrically distributed around the central axis X0. The central axis X2 defines in operation the central axis of the second eccentric member 58 as a whole.

The coupling member 77 is mounted on an annular protrusion 624 formed on the bottom face of the first eccentric shaft 62. The coupling member 77 has a first and second pin 79 formed respectively on its top surface and bottom surface. The first and second pin 79 are symmetrically distributed with respect to the central axis of the coupling member 77. The first eccentric sleeve 69 and the second eccentric sleeve 75 each has a radial slot 80 to receive a corresponding pin 79. The width of the slot 80 approximates to the diameter of the pin 79.

A bearing 71 is tightly mounted radially on the second eccentric sleeve 75. A bearing seat 82 is mounted around the perimeter of the bearing 71. A plurality of bolts fasten the annular inner plate 42 to the bearing seat 82. The annular inner plate 42 and the second eccentric sleeve 75 are coaxial. A guard 91 is mounted on the bottom end of the connecting shaft 32 to retain the second eccentric member 58 and a bolt 93 is fastened tightly thereto.

When the eccentric stroke of the sanding plate 4 is to be adjusted, the bolt member 50 is inserted into a corresponding recess 524 of the chuck 52 so as to prevent the principle drive shaft 3 from rotating. The annular outer plate 44 is rotated in the direction indicated by an arrow a in FIG. 3. The outer race 64 rotates together with the annular outer plate 44. Friction between the outer race 64 and the roller 63 of the overrun clutch 54 causes the first eccentric sleeve 69, the second eccentric sleeve 75 and the annular inner plate 42 to rotate accordingly. By virtue of the fact that the annular outer plate 44 is securely coupled to and coaxial with the first eccentric sleeve 69, the central axis X1 of the annular outer plate 44 rotates around the central axis X3 of the first eccentric shaft 62. Since the central axis X0 of the principle drive shaft 3 is fixed, the distance between the central axis X1 and X0 (ie the eccentric stroke of the annular outer plate 44) changes. The eccentric stroke of the central axis X2 of the annular inner plate 42 with respect to the central axis X0 also changes and approximates to the eccentric stroke of the annular outer plate 44. The overrun clutch 54, the spring 590 and the ball head locating post 592 disposed between the balancing drum 55 and the chuck 52 prevent the adjusted eccentric stroke from displacement. According to the requirements of the workpiece, the eccentric stroke adjusting mechanism 5 can adjust the eccentric stroke of more than one sanding plate 42, 44 at the same time and can ensure that the sander is balanced during operation.

Figure 6:
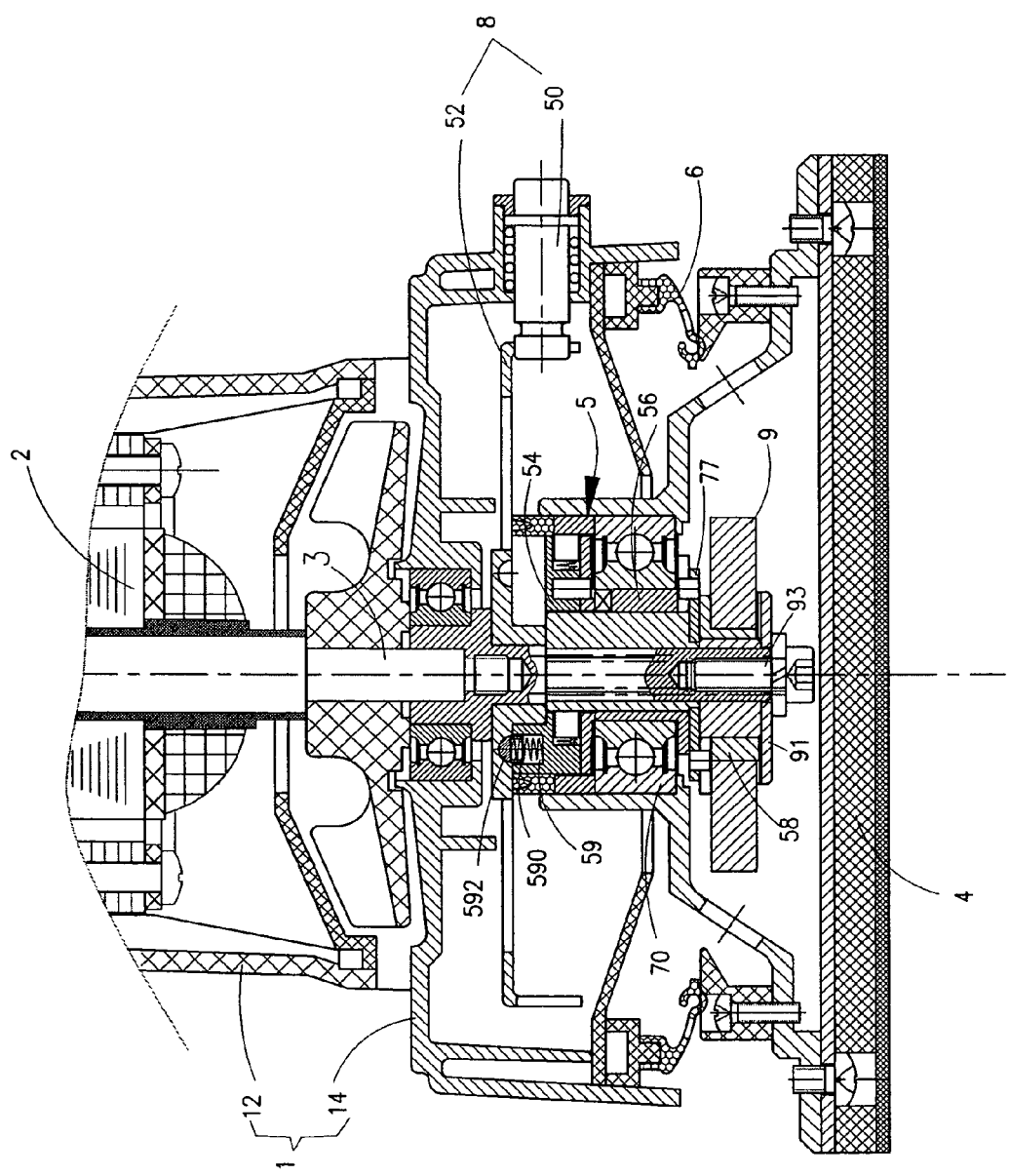
FIG. 6 is a sectional view of a sander according to a second embodiment of the present invention.

FIG. 6 illustrates a rotary sander of a second embodiment of the present invention. The parts in the second embodiment which are the same as or similar to the parts in the first embodiment will not be described in detail and will adopt the same numeral. The rotary sander of the second embodiment comprises an upper housing part 12, a lower housing part 14, a motor 2 vertically disposed inside the housing 1, a principle drive shaft 3, a sanding plate 4 and an eccentric stroke adjusting mechanism 5. The eccentric stroke adjusting mechanism 5 comprises an overrun clutch 54, a first eccentric member 56 and a second eccentric member 58. A coupling member 77 couples the first eccentric member 56 and the second eccentric member 58. The sanding plate 4 of the second embodiment is a single disk. A balancing block 9 is directly attached to a second eccentric sleeve 75 of the second eccentric member 58 (in place of the annular inner plate 44 and the bearing of the first embodiment). In the second embodiment no balancing drum 55 is present. Instead the overrun clutch 54 engages the chuck 52 directly and a recess 59 is present on the upper surface of an annular main body 60 of the overrun clutch 54. A spring 590 and a ball head locating post 592 connected to the spring 590 are disposed in the recess 59. The ball head locating post 592 extends partially into a location hole 525 under the force of the spring 590 to restrainedly couple the overrun clutch 54 and the chuck 52.

Figure 9:
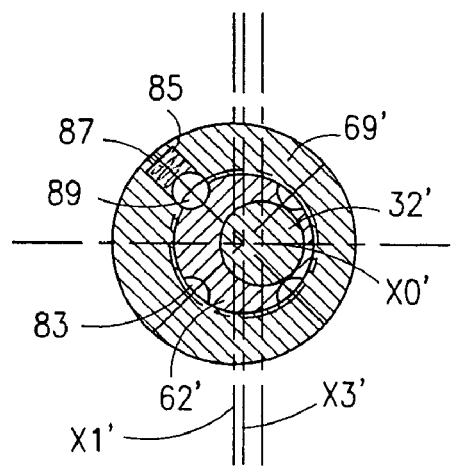
FIG. 9 is a sectional view taken along line N-N shown in FIG. 7.
Figure 4:
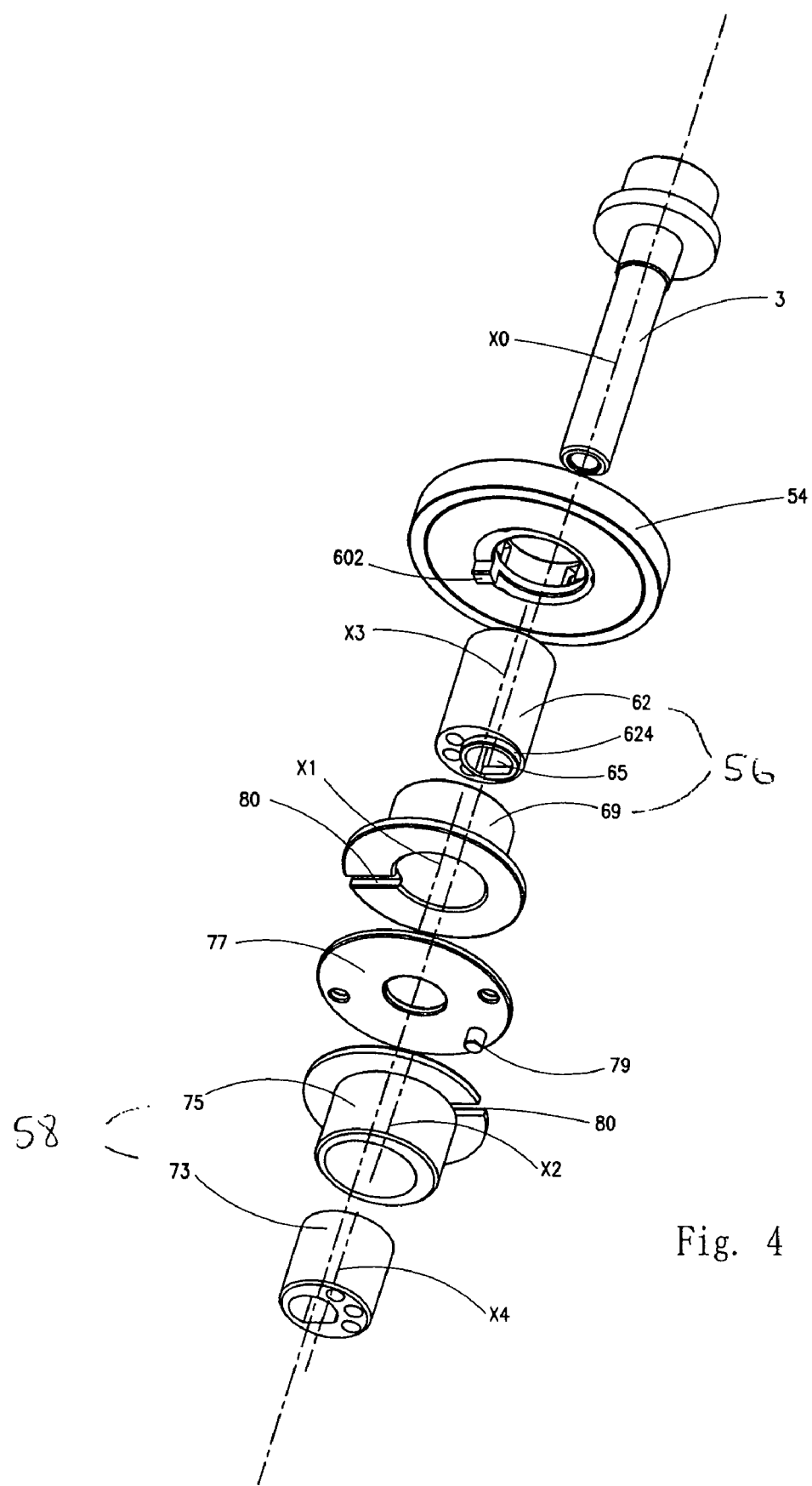
FIG. 4 is an exploded perspective view of the eccentric stroke adjusting mechanism shown in FIG. 1.
Figure 5:
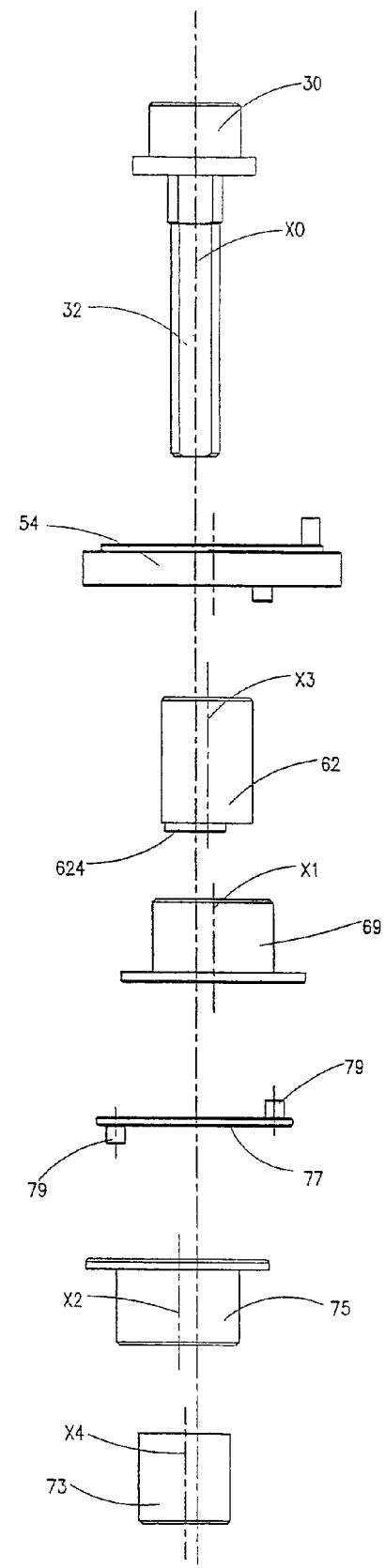
FIG. 5 is a front plan view of FIG. 4.
Figure 7:
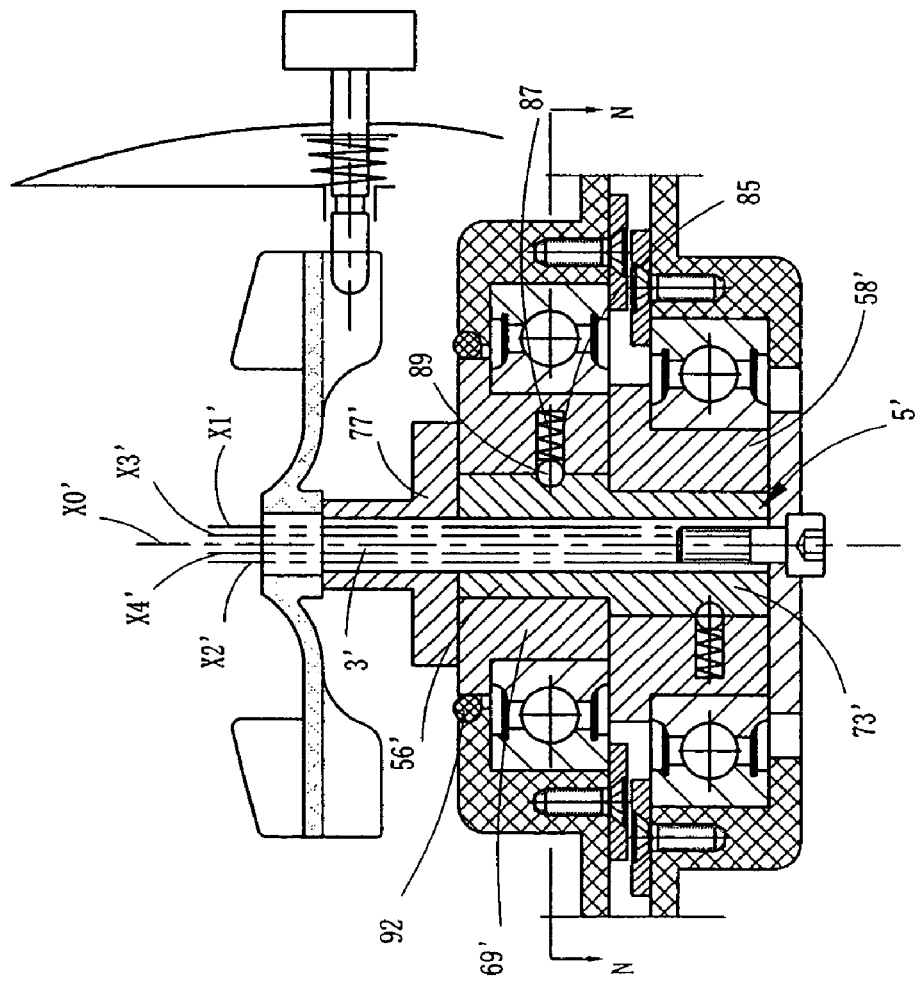
FIG. 7 is a sectional view of a sander according to a third embodiment of the present invention.
Figure 8:
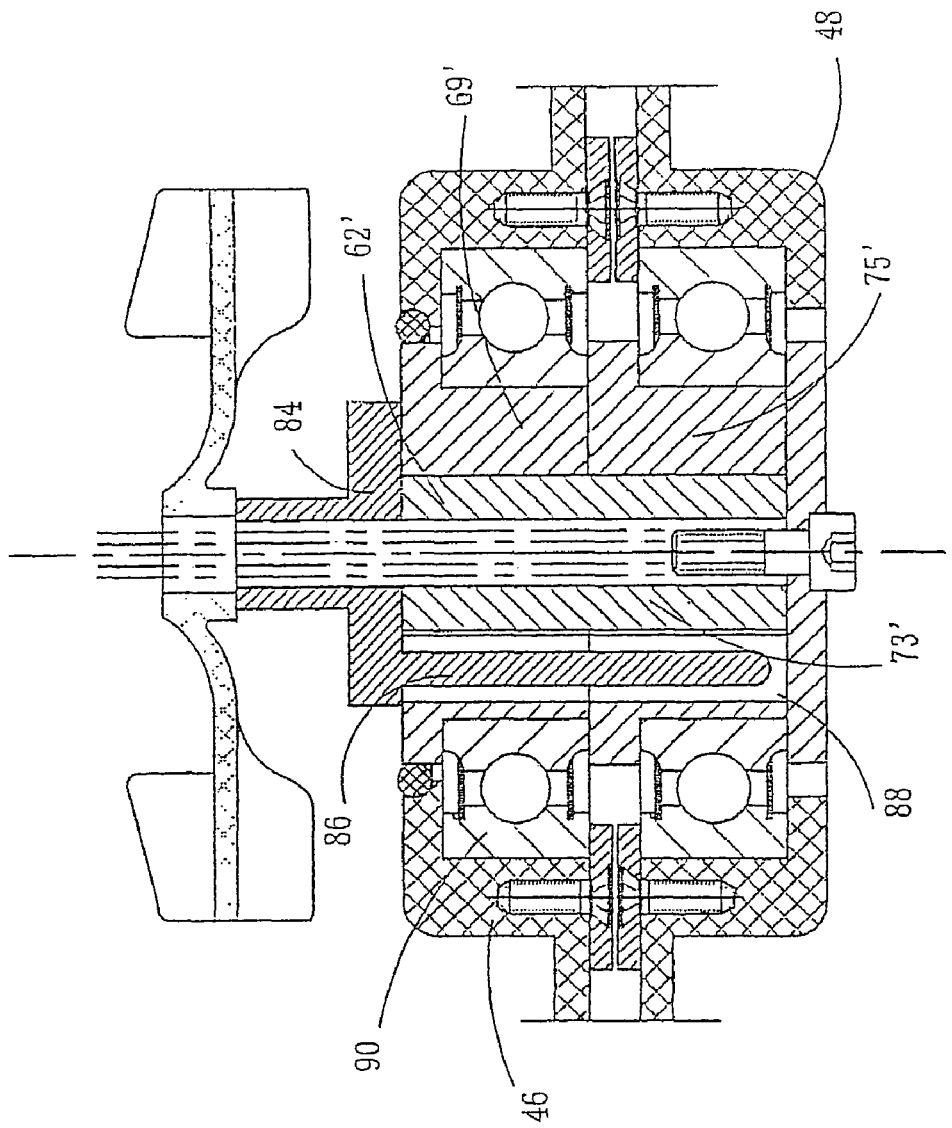
FIG. 8 is a sectional view from another direction of the sander according to the third embodiment of the present invention.

FIGS. 7 to 9 illustrate an eccentric stroke adjusting mechanism 5' of a third embodiment of the present invention (similar to the eccentric stroke adjusting mechanism 5 of the first and second embodiment described above) for use in a power tool having a principle drive shaft 3'. The eccentric stroke adjusting mechanism 5' comprises a first eccentric member 56' mounted on the principle drive shaft 3', a second eccentric member 58' mounted on the principle drive shaft 3' and a coupling member 77' for coupling the first eccentric member 56' and the second eccentric member 58'.

The first eccentric member 56' has a first central axis X1'. The second eccentric member 58' has a second central axis X2'. The eccentric stroke of the first central, axis X1' and the second central axis X2' with respect to a central axis X0' of the principle drive shaft 3' is adjustable. The first eccentric member 56' comprises a first eccentric shaft 62' mounted radially on the principle drive shaft 3' and a first eccentric sleeve 69' rotatable with respect to the principle drive shaft 3'. The second eccentric member 58' comprises a second eccentric shaft 73' mounted on the principle drive shaft 3' and a second eccentric sleeve 75' rotatable with respect to the principle drive shaft 3'. A central axis X3' of the first eccentric shaft 62' and a central axis X4' of the second eccentric shaft 73' are eccentric with respect to the central axis X0 of the principle drive shaft 3' and on opposite sides thereof. The first eccentric sleeve 69' and the second eccentric sleeve 75' are separately rotatably mounted on the first eccentric shaft 62' and the second eccentric shaft 73'. The central axis of the first eccentric sleeve 69' defines in practice the central axis X1' of the first eccentric member 56'. The central axis of the second eccentric sleeve 75' defines in practice the central axis X2' of the second eccentric member 58'. The central axis X1' of the first eccentric sleeve 69' is eccentric with respect to the central axis X3' of the first eccentric shaft 62' and the central axis X0' of the principle drive shaft 3'. The central axis X2' of the second eccentric sleeve 75' is eccentric with respect to the central axis X4' of the second eccentric shaft 73' and the central axis X' of the principle drive shaft 3'. The central axes X1' and X2' are on opposite sides of the central axis X0'.

A plurality of locating sockets 83 are formed on the outer surface of the first eccentric shaft 62' and the second eccentric shaft 73'. A plurality of radial receiving recesses 85 are formed on the inner circumferential surface of the first eccentric sleeve 69' and of the second eccentric sleeve 75'. The receiving recesses 85 each have an elastic element 87 seated therein and a locating post 89 is connected to the elastic element 87. The locating post 89 can be selectively received in one of the corresponding locating sockets 83 so as to restrainedly couple the first and the second eccentric sleeve 69', 75' with the first and the second eccentric shaft 62', 73' respectively.

The coupling member 77' has an operating body 84 rotatably mounted on the principle drive shaft 3' and an extension pin 86 extending downwardly therefrom. Each of the first and the second eccentric sleeve 69', 75' have an axial receiving bore 88 to accommodate the extension pin 86. The diameter of the receiving bore 88 approximates to the diameter of the extension pin 86. The length of the receiving bore 88 is longer than the length of the extension pin 86.

Sanding plates 46 and 48 are coupled to the first eccentric sleeve 69' and the second eccentric sleeve 75' via a bearing 90. A seal ring 92 is interposed between the sanding plate 46 and the first eccentric sleeve 69'.

The operating body 84 of the coupling member 77' can be manually rotated to allow the eccentric stroke of the sanding plates 46 and 48 to be adjusted. The principle of adjustment is the same as described above for the first and the second embodiment.

Figure 10:
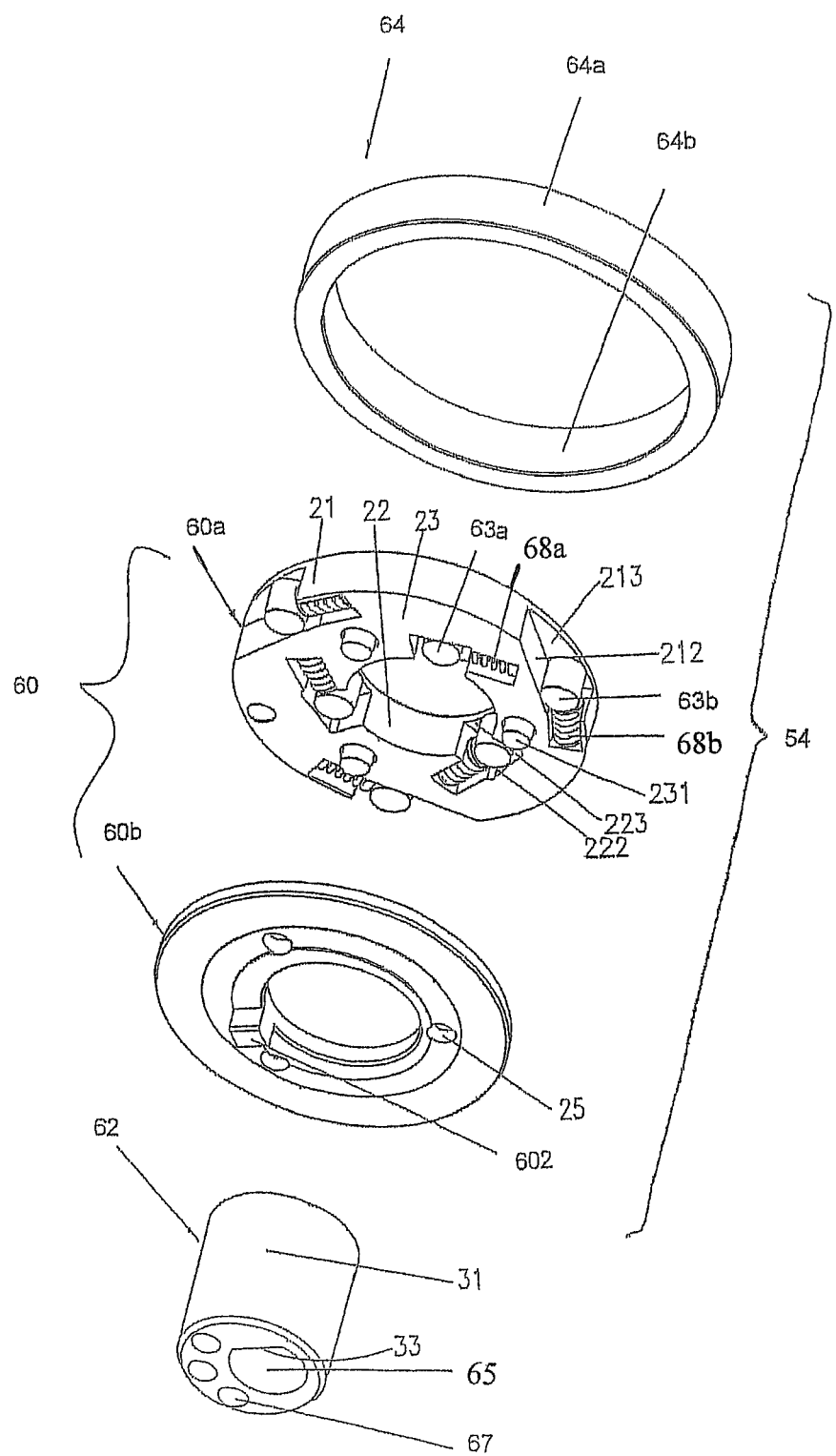
FIG. 10 is an exploded perspective view of an embodiment of the clutch mechanism according to the present invention.
Figure 11:
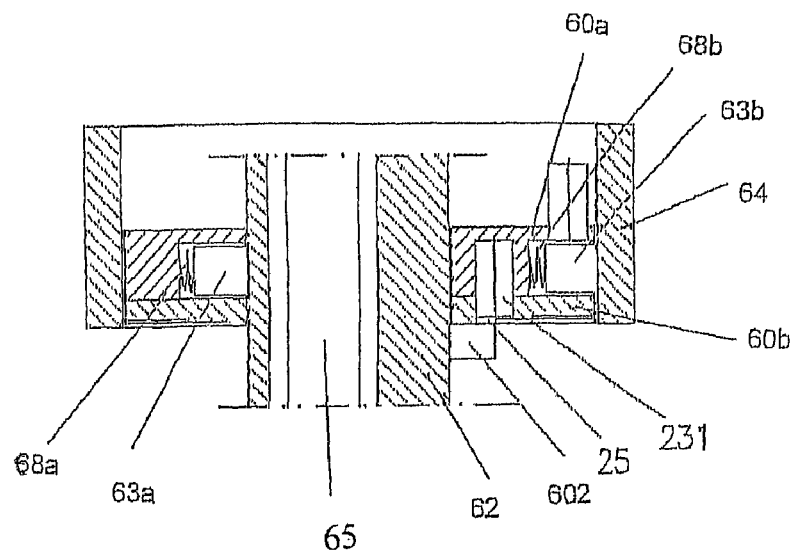
FIG. 11 is a longitudinal cross-sectional view of the clutch mechanism of FIG. 10.
Figure 12:
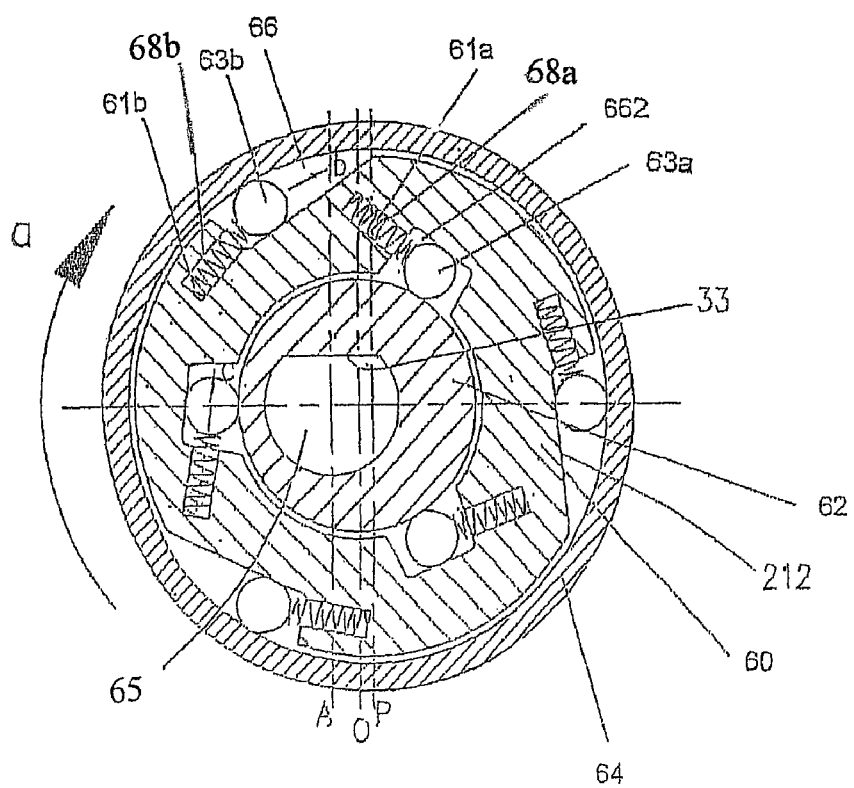
FIG. 12 is an axial cross-sectional view of the clutch mechanism of FIG. 10.

FIGS. 10 to 12 illustrate in isolation an embodiment of a clutch mechanism 54 of the present invention for adjusting eccentricity in a power tool. The clutch mechanism 54 comprises an annular main body 60 mounted radially on an upper part of an eccentric shaft 62. The annular main body 60 includes a base 60a and a cover 60b. The base 60a has an outer circumferential wall 21, an inner circumferential wall 22 with a central axis Q, a top face 23 and a bottom face. The axis of the outer circumferential wall 21 and the axis Q are eccentric with respect to each other. The base 60a has three axial locating pins 231 at intervals on the top surface 23. The cover 60b has three locating holes 25 formed at intervals. The three pins 231 engage the three holes 25 respectively. Formed on one face of the cover 60b is an axial projection 602 for connecting the clutch mechanism 54 to an eccentric mechanism of the power tool (not shown).

A ring-shaped outer race 64 has an outer wall 64a and an inner wall 64b and is mounted radially on the annular main body 60. The outer race 64 has a central axis P which is coincident with the central axis of the outer circumferential wall 21. On the outer race 64 is securely mounted radially a coupling arrangement (eg a coupling sleeve) for coupling the eccentric shaft 62 to a sanding plate (not shown). The central axis of the coupling arrangement (and therefore the sanding plate) is coincident with axis P.

There are three second wedge-shaped recesses 66 formed at 120° intervals on the outer circumferential wall 21 of the annular main body 60a. Each of the second wedge-shaped recesses 66 has an inclined wall 212 and a retaining wall 213. Each second wedge-shaped recess 66 terminates in a narrow receiving bore 61b. A loaded spring 68b is disposed in the narrow receiving bore 61b and is connected to an outer roller 63b seated in the wedge-shaped recess 66.

There are three first wedge-shaped recesses 662 formed at 120° intervals on the inner circumferential wall 22 of the annular main body 60a. Each of the first wedge-shaped recesses 662 has an inclined wall 222 and a retaining wall 223. Each first wedge-shaped recess 662 terminates in a narrow receiving bore 61a. A loaded spring 68a is disposed in the narrow receiving bore 61a and is connected to an inner roller 63a seated in the wedge-shaped recess 662.

The eccentric shaft 62 has three longitudinal off-axis bores 67 to reduce its weight and improve its balance. The eccentric shaft 62 has an outer wall 31 and a longitudinal bore 65 formed parallel to its central axis. The shape of the longitudinal bore 65 matches the shape of a principle drive shaft of the power tool (not shown) so that the eccentric shaft 62 can be securely mounted radially on the principle drive shaft. The longitudinal bore 65 has a linear portion 33 for engaging a linear portion of the principle drive shaft. The central axis of the outer wall 31 is the same as the central axis Q of the inner circumferential wall 22. The longitudinal bore 65 has a central axis A. The central axes A, Q and P are eccentric with respect to each other.

To assemble the clutch mechanism 54, the cover 60b is installed onto the base 60a by inserting the three pins 231 into the three holes 25. Secondly, the annular main body 60 is mounted radially on an upper part of the eccentric shaft 62.

Each of the inner rollers 63a is disposed between the inclined wall 222 of the first wedge-shaped recess 662 and the outer wall 31 of the eccentric shaft 62. Finally, the outer race 64 is mounted radially on the annular main body 60. Each outer roller 63b is disposed between the first inclined wall 212 of the second wedge-shaped recess 66 and the inner wall 64b of the outer race 64. The first and second retaining walls 213, 223 prevent the outer and inner rollers 63b, 63a falling out of the second and first wedge-shaped recesses 662, 66, respectively.

In use when the eccentric shaft 62 is driven by the principle drive shaft of the power tool, the spring 68a urges the inner roller 63a in an engagement direction shown by arrow a and the annular main body 60 rotates with the eccentric shaft 62 around the axis A in the direction of arrow a. In this circumstance, the clutch mechanism 54 serves as a power transferring mechanism. In use when the principle drive shaft of the power tool is locked (for example by a chuck), the outer race 64 may be rotated and the outer roller 63b is urged by the spring 68b in an engagement direction. The friction between the outer roller 63b and the outer race 64 causes the annular main body 60 to rotate with the outer race 64. The central axis P rotates around the central axis Q whereby to adjust the eccentric stroke (ie P relative to A) of the sanding plate.

Although, the present invention may be embodied in other specific forms without departing from its structures, methods or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A clutch mechanism for adjusting eccentricity in a power tool comprising:
   a principle drive shaft;
   an eccentric shaft driveable by the principle drive shaft, wherein the eccentric shaft is disposed eccentrically to the drive shaft and comprises a recess;
   an annular main body mounted radially on the eccentric shaft, wherein the annular main body comprises an axial projection formed on an end face which is cooperable with the recess on the eccentric shaft;
   an outer race mounted radially on the annular main body;
   at least one first connecting member disposed between the outer race and the annular main body such that when the principle drive shaft is locked the outer race and the annular main body are rotatable together in a common direction; and
   at least one second connecting member disposed between the annular main body and the eccentric shaft such that when the principle drive shaft rotates the annular main body and the eccentric shaft are rotatable together in a common direction.

2. The clutch mechanism as defined in claim 1, wherein the annular main body has an outer circumferential wall and an inner circumferential wall and wherein a first inclined wall is formed on the outer circumferential wall and a second inclined wall is formed on the inner circumferential wall.

3. The clutch mechanism as defined in claim 2, wherein the first connecting member is a first roller movable along the first inclined wall and the second connecting member is a second roller movable along the second inclined wall.

4. The clutch mechanism as defined in claim 2, wherein the inner circumferential wall has a plurality of first wedge-shaped recesses and the outer circumferential wall has a plurality of second wedge-shaped recesses, each first wedge-shaped recess having a wall which serves as the first inclined wall and each second wedge-shaped recess having a wall which serves as the second inclined wall.

5. The clutch mechanism as defined in claim 4, wherein each first and second wedge-shaped recess terminates in a narrow receiving bore.

6. The clutch mechanism as defined in claim 5, wherein in each narrow receiving bore is disposed a loaded elastic member.

7. The clutch mechanism as defined in claim 1, wherein the annular main body includes a base having at least one first securement member and a cover having at least one second securement member adapted to mate with the first securement member.

8. The clutch mechanism as defined in claim 1, wherein the eccentric shaft has a longitudinal bore for securely mounting the eccentric shaft radially on the principle drive shaft.

9. The clutch mechanism as defined in claim 1, wherein the annular main body has an inner circumferential wall and an outer circumferential wall, wherein the eccentric shaft has an outer wall and a longitudinal bore, the longitudinal bore of the eccentric shaft has a first central axis, the outer wall of the eccentric shaft and the inner circumferential wall of the annular main body have a common second central axis and the outer circumferential wall of the annular main body and the outer race have a common third axis, wherein the first, second and third central axes are eccentric with respect to each other.

10. The clutch mechanism as defined in claim 9, wherein when in use the principle drive shaft is locked, the third central axis rotates around the second central axis whereby to adjust the eccentricity of the third central axis relative to the first central axis.

11. The clutch mechanism as defined in claim 9, wherein the inner circumferential wall comprises a plurality of first wedge-shaped recesses and the outer circumferential wall comprises a plurality of second wedge-shaped recesses, wherein in each first wedge-shaped recess is seated the second connecting member and in each second wedge-shaped recess is seated the first connecting member, wherein each of the first connecting member and second connecting member is respectively urged by an elastic element disposed between a base of the wedge-shaped recess and a roller whereby the elastic element urges the roller outwardly away from the base of the recess.

12. The clutch mechanism as defined in claim 11, wherein when in use the principle drive shaft rotates, the rollers in the inner circumferential wall securely engage the principle drive shaft.

13. The clutch mechanism as defined in claim 12, wherein when in use the principle drive shaft rotates, the rollers in the outer circumferential wall disengage the outer race.

14. The clutch mechanism as defined in claim 11, wherein when in use the principle drive shaft is locked, the rollers in the outer circumferential wall engage the outer race.

* * * * *